Oct. 14, 1969  J. A. FERRY  3,473,056
POWER TRANSMISSION SYSTEM FOR HIGH VOLTAGE ACCELERATORS
Filed Aug. 9, 1967  3 Sheets-Sheet 1

INVENTOR
JAMES A. FERRY
BY McDougall, Hersh, Scott & Ladd
ATTORNEYS

United States Patent Office 3,473,056
Patented Oct. 14, 1969

3,473,056
POWER TRANSMISSION SYSTEM FOR HIGH VOLTAGE ACCELERATORS
James A. Ferry, Madison, Wis., assignor to National Electrostatics Corp., Middleton, Wis., a corporation of Wisconsin
Filed Aug. 9, 1967, Ser. No. 659,515
Int. Cl. H02n 1/00; H01j 7/16
U.S. Cl. 310—6                          13 Claims

ABSTRACT OF THE DISCLOSURE

A high voltage accelerator comprising a grounded supporting member, a high voltage electrode, one or more intermediate electrodes, vacuum pumps mounted on said high voltage electrodes and said intermediate electrode and connected to said accelerating tube for evacuating said tube, rotary electrical generators mounted on said high voltage electrode and said intermediate electrodes for supplying operating electrical power to said vacuum pumps, and a rotary motor on said supporting member.

SPECIFICATION

This invention relates to high voltage accelerators and pertains particularly to a power transmission system for such accelerators.

Generally, a high voltage accelerator comprises a grounded supporting member, a high voltage electrode, means for producing high voltage between the electrode and the supporting member, an accelerating tube adapted to use the high voltage, and an ion source for producing charged particles which travel within the tube and are accelerated by the high voltage.

The copending application of Raymond G. Herb, entitled, "High Voltage Accelerator and Accelerating Tube Therefor," discloses an accelerator in which the accelerating tube is divided into a plurality of sections with isolating diaphragms therebetween. The charged particles to be accelerated are caused to travel through aligned apertures in the diaphragms. It is preferred to provide a separate evacuating device for each section of the accelerating tube. The evacuating devices are normally in the form of vacuum pumps which are mounted on the high voltage electrode and also preferably on intermediate electrodes disposed between the high voltage electrode and the grounded supporting member. This construction provides an accelerating tube which is highly resistant to sparking and flashovers within the tube. Thus, the accelerating tube will withstand an extremely high working voltage.

Normally, the vacuum pumps require operating electrical power. The present invention deals with the problem of transmitting power to the intermediate electrodes, also to the high voltage electrode for operating such vacuum pumps, and also for operating other devices, such as the ion source, which require operating electrical power.

In accordance with the present invention, rotary electrical generators are mounted on the electrodes, wherever it is necessary to supply electrical power. Thus, the generators may be mounted on the high voltage electrode, and also on the intermediate electrodes. A rotary motor is mounted on a grounded support. The motor is connected to all the generators by means of an insulating shaft having a plurality of sections, which preferably are axially aligned. The shaft preferably comprises a series of insulating members, with a series of conductive members interspersed therebetween and secured thereto. A series of potential distribution electrodes are provided between the high voltage electrode and the grounded supporting member. Corona gaps or other means are provided between the potential distribution electrodes to equalize the potential gradient. A series of corona points are preferably connected to the potential distribution electrodes and are directed toward the conductive members for equalizing the potential gradient along the shaft.

Further objects and advantages of the present invention will appear from the following description, taken with the accompanying drawings, in which.

Figure 1:
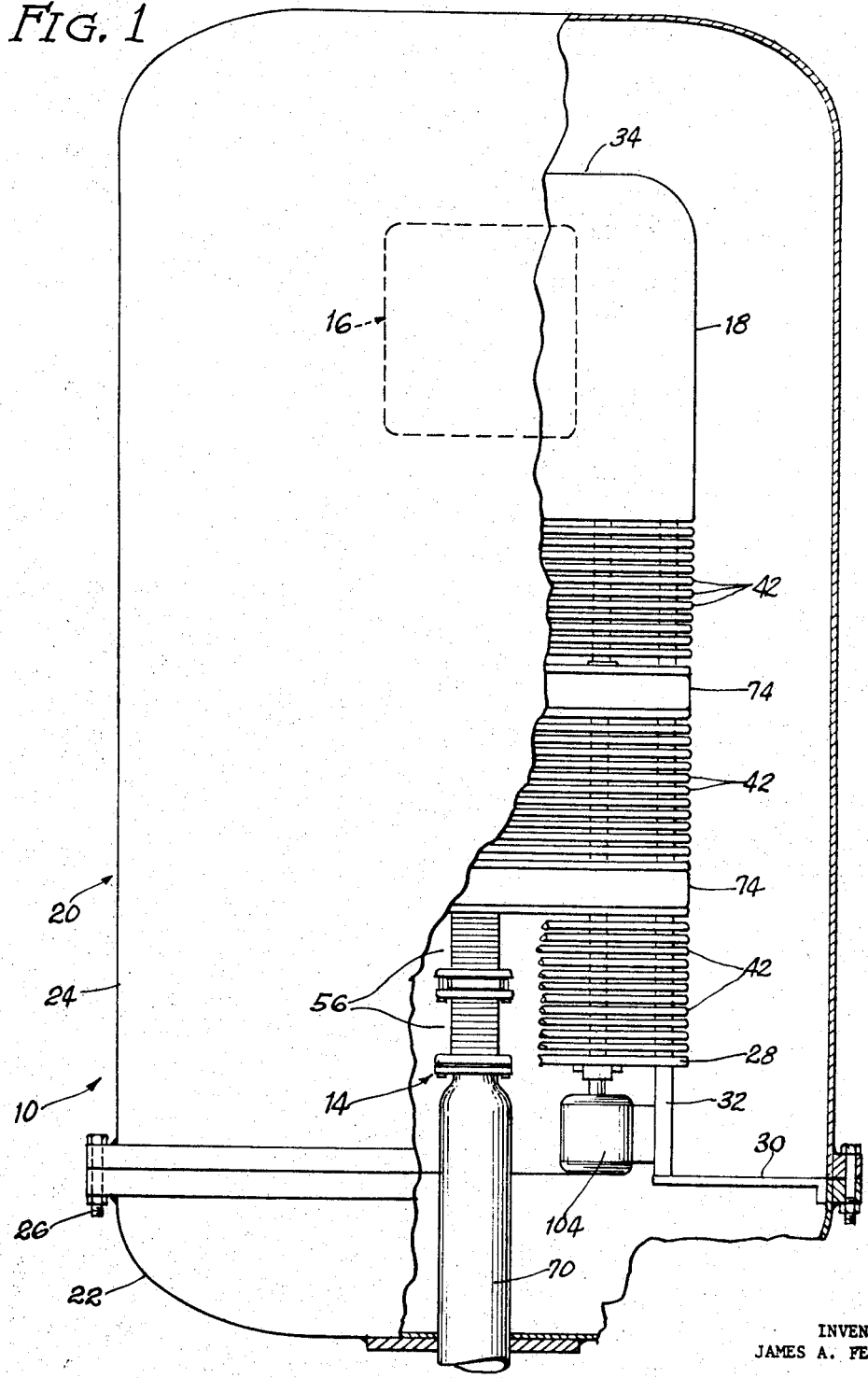
FIG. 1 is an elevational view, partly in longitudinal section, showing a high voltage accelerator to be described as an illustrative embodiment of the present invention.
Figure 2:
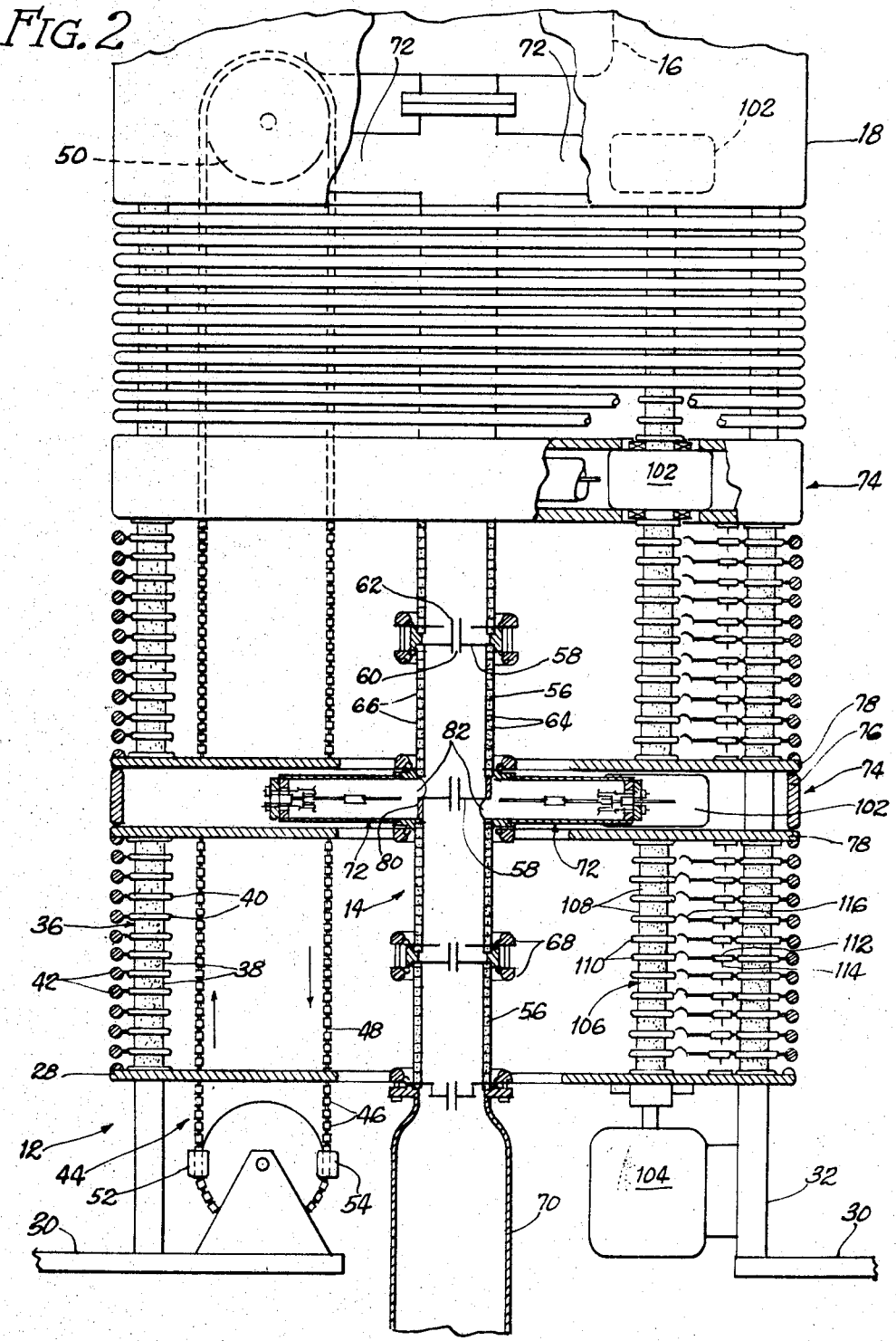
FIG. 2 is a fragmentary longitudinal section showing the high voltage generator, the accelerating tube and the power transmission system for the accelerator.

As already indicated, FIGS. 1 and 2 illustrate a high voltage accelerator 10 for accelerating charged particles to high energy levels. The charged particles may comprise protons, deuterons, or electrons, for example. The accelerator is capable of developing a working voltage of several million volts for acceleraitng the charged particles.

Generally, the accelerator 10 comprises a high voltage generator 12, an accelerating tube 14, and an ion source 16. The generator 12 produces a voltage ranging up to several million volts. This voltage is employed to accelerate the charged particles in the accelerating tube 14. The ion source 16 produces the charged particles and directs them into the accelerating tube 14 so that they will travel along the tube and be accelerated by the high voltage.

The high voltage generator 12 is preferably of the electrostatic type comprising a high voltage electrode 18 to which electrostatic charges are transported, so as to raise the voltage of the electrode. The entire high voltage generator 12 is preferably surrounded with a high pressure atmosphere comprising a gas having high dielectric strength. The use of the high pressure gas prevents flashovers between the high voltage electrode 18 and ground. Flashovers at other points are also prevented. It is preferred to employ sulfur hexafluoride as the high pressure dielectric gas, but other suitable gases may also be employed. To contain the high pressure atmosphere, the high voltage generator 12 is mounted within a tank 20, preferably made of steel or the like. The illustrated tank 20 comprises a lower section or base 22 and a removable upper section 24 which is normally clamped to the base 22 by means of bolts 26. When it is desired to do work upon the high voltage generator 12 or the accelerating tube 14, the upper section 24 of the tank may be removed, after most of the dielectric gas has been withdrawn so as to reduce the pressure within the tank.

As illustrated, the high voltage generator 12 is mounted on a supporting member in the form of a plate 28 which is secured to the base 22 of the tank 20. The supporting plate 28 is preferably made of steel or other conductive material and is grounded so as to serve as the grounded electrode of the high voltage generator. Brackets 30 may be employed to connect the plate 28 to the base 22.

The high voltage electrode 18 is illustrated in the form of a hollow conductive cylinder which is open at its lower end but is closed at the opposite end by an upper wall 34. Thus, the illustrated construction is single-ended, but a double-ended construction may also be employed, as disclosed in the copending application of Raymond G. Herb and James A. Ferry, Ser. No. 557,818, filed June 15, 1966. The high voltage electrode 18 is supported by a plurality of insulators in the form of columns or posts 36. The lower ends of the insulators 36 are mounted on the grounded supporting plate 28. The upper ends of the insulators 36 are connected to the high voltage electrode 18.

Preferably, the insulators 36 are of the construction disclosed and claimed in the copending application of Raymond G. Herb and James Raatz, Ser. No. 557,729, filed June 15, 1966. Thus, each of the illustrated insulators 36 comprises a series of insulating cylindrical sections 38 interspersed between conductive disks 40. The insulating components are preferably bonded to the metal components by the method disclosed in the copending application of Raymond G. Herb, Ser. No. 557,787, filed June 15, 1966.

It is preferred to mount equalizing rings 42 on the metal disks 40 of the insulators 36. The rings 42 are of a diameter corresponding generally to the diameter of the high voltage electrode 18. Thus, the rings 42 extend around all of the insulators 36. The provisions of the rings 42 equalizes the potential around all of the insulators and assists in producing a substantially uniform potential gradient along the insulators. The high voltage generator 12 is generally of the construction disclosed and claimed in the copending application of Raymond G. Herb and James A. Ferry, Ser. No. 557,818, filed June 15, 1966. Thus, the high voltage generator 12 comprises an endless charge carrying conveyor 44, which might be in the form of an endless belt, but preferably comprises a train of charge carrying pellets or beads 46. Each pellet 46 is preferably made of metal or other conductive material. The pellets 46 are strung together in such a manner that the pellets are insulated tfrom one another. Thus, the pellets 46 may be mounted on an endless insulating cord 48, or may be connected together by other insulating members so as to form an endless chain.

The conveyor 44 extends between the grounded electrode 28 and the high voltage electrode 18. Both flights of the endless pellet train are preferably arranged to carry charges to and from the high voltage electrode 18, so that a high voltage will be built up on the electrode. Thus, for example, positive charges may be carried to the high voltage electrode 18 by one flight of the endless conveyor 44, while negative charges are carried away from the high voltage electrode by the other flight. The result is to produce a high positive voltage between the high voltage electrode 18 and ground.

At each end of the conveyor 44, the train of pellets 46 passes around a pulley 50. At the grounded end of the conveyor 44, the pulley 50 may be driven by a suitable motor, not shown.

Means are provided to charge the pellets 46 as they depart from the grounded pulley 50. The charges thus imparted to the pellets are carried to the high voltage electrode 18 where suitable means are employed to transfer the charges to the high voltage electrode. The upper end of the conveyor 44 is housed within the high voltage electrode 18, so that the charges removed from the pellets will travel outwardly to the outer surface of the high voltage electrode. Means are provided on the high voltage electrode to transfer charges of the opposite sign to the departing pellets. These charges are removed from the pellets when they arrive at the grounded pulley 50. As shown in FIG. 2, an induction electrode 52 is preferably provided adjacent the grounded pulley to assist in charging the departing pellets. Another induction electrode 54 is provided to assist in discharging the arriving pellets. The charging electrode 52 may be maintained at a high voltage of several thousand volts, for example, by means of a suitable power supply, so that the pellets will be correspondingly charged. Further details of the charging and discharging systems may be obtained by referring to the copending application, Ser. No. 557,818.

The construction and arrangement of the illustrated accelerating tube 14 is in accordance with the invention disclosed and claimed in the copending application of Raymond G. Herb, entitled, "High Voltage Accelerator and Accelerating Tube Therefor." As shown, the accelerating tube 14 is connected between the high voltage electrode 18 and the grounded electrode 28, so that the entire voltage developed on the high voltage electrode 18 is impressed along the length of the tube 14. The high pressure atmosphere of the dielectric gas substantially prevents sparking or flashovers along the outside of the accelerating tube 14. However, the inside of the tube is maintained at a high vacuum. With prior constructions, difficulties have been encountered with sparking and flashovers within the accelerating tube. Such difficulties have severely limited the working voltage which may be maintained along the length of the tube.

In order to improve the ability of the accelerating tube 14 to withstand high voltages, the illustrated tube 14 is subdivided into a plurality of insulating sections 56. Isolating diaphragms 58 are provided between the adjacent sections 56. The diaphragms 58 are preferably made of metal or other conductive material. Each diaphragm 58 is formed with an aperture 60 for the passage of the charged particles. The apertures 60 are preferably located axially in the accelerating tube 14. As shown, each aperture 60 is formed by a tube 62, mounted in and extending through the corresponding diaphragm 58. The tubes 62 are preferably made of metal or other conductive material. The apertures 60 are preferably considerably smaller than the inside diameter of the insulating sections 56. However, the size of the apertures and the length of the tubes 62 may be varied to a considerable extent. Moreover, the tubes may be eliminated in favor of simple apertures. The isolating diaphragms 58 tend to prevent the propagation of any local sparking or other discharge which may occur along the inner wall of one of the sections 56.

As already indicated, a high vacuum is maintained within the accelerating tube 14. The main vacuum pump or pumps may be connected to the grounded metal tube 70 outside the tank 20. However, as disclosed and claimed in the Herb application, just mentioned above, some or all of the individual sections 56 are separably evacuated by means of a plurality of evacuating devices 72, connected to intermediate points along the accelerating tube. Preferably, a separate evacuating device 72 is provided for each of the insulating sections 56, so that the chamber within each section will be separately evacuated. The separate evacuation of the individual sections assists in enabling the accelerating tube to withstand extremely high voltages. Any local sparking or other discharge which may occur momentarily within the accelerating tube may tend to cause the evolution of gases from the walls of the tube. Moreover, the evolution of gases may be caused by mechanical, thermal and other disturbances at local points along the accelerating tube. The separate evacuation of the individual sections insures that any evolved gases will immediately be removed, so that they will not tend to cause a general flashover along the length of the tube.

The evacuating devices 72 preferably take the form of vacuum pumps, but may comprise passive gas absorbing devices containing gettering materials, capable of absorbing gases. Any suitable type of vacuum pump may be employed. However, the pumps are preferably of the ion-getter type, comprising both ionizing means and gettering means. The illustrating pumps 72 are of the orbitron type, as disclosed and claimed in the Herb and Pauly Patent No. 3,244,696, patented Apr. 5, 1966, entitled, "Electron Orbiting Tubes for Ion Measurement and Gettering Pumps."

The evacuating devices or pumps 72 are preferably mounted on one or more intermediate electrodes 74 which are interspersed between the high voltage electrode 18 and the grounded electrode 28. The intermediate electrodes 74 are also supported by the insulators 36, which are divided into sections with the intermediate electrodes therebetween. It will be understood that the intermediate electrodes assume intermediate voltages in accordance with the potential gradient between the high voltage electrode 18 and the grounded electrode 28.

The intermediate electrodes 74 may assume various forms. As illustrated, each intermediate electrode 74 comprises a cylindrical ring 76 which is mounted between a pair of circular plates 78. The illustrated evacuating devices 72 are mounted within the intermediate electrodes 74, in the spaces between the plates 78.

It is preferred to arrange the accelerating tube 14 so that a plurality of the insulating sections 56 are connected between each pair of intermediate electrodes 74. Preferably, two of the insulating sections 56 are connected together between each pair of adjacent intermediate electrodes 74. Thus, one of the isolating diaphragms 58 is adjacent each intermediate electrode 74. Another isolating diaphragm 58 is disposed midway between each pair of adjacent intermediate electrodes 74.

It is preferred to mount two of the evacuating devices 72 on each intermediate electrode 74. These evacuating devices are connected separately to the tube sections 56 on opposite sides of the adjacent isolating diaphragm 58. In the specific construction shown in FIG. 2, a metal ring 80 is connected between the insulating sections 56 at each intermediate electrode 74. The isolating diaphragm 58 is mounted centrally within the ring 80. Separate apertures 82 are formed in the ring 80 above and below the diaphragm 58. The two separate evacuating devices 72 are connected to the separate apertures 82.

It will be seen that two additional evacuating devices 72 are mounted within the high voltage electrode 18. One of these evacuating devices 72 is connected to the uppermost section 56 of the accelerating tube 14. The other evacuating device 72 is connected to the lower end of the ion source 16 to maintain a high vacuum therein.

Figure 3:
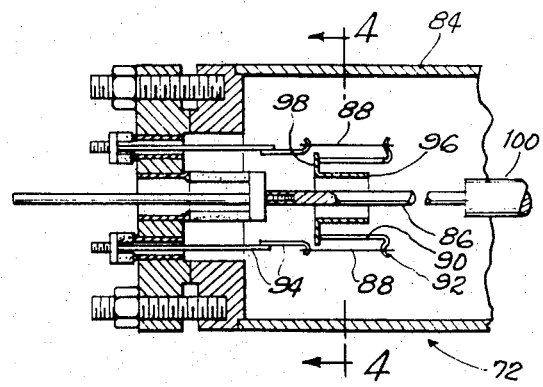
FIG. 3 is a fragmentary enlarged section showing one of the ion-getter vacuum pumps employed as an evacuating device for the accelerating tube, the view being taken generally along the line 3—3 of FIG. 4.
Figure 4:
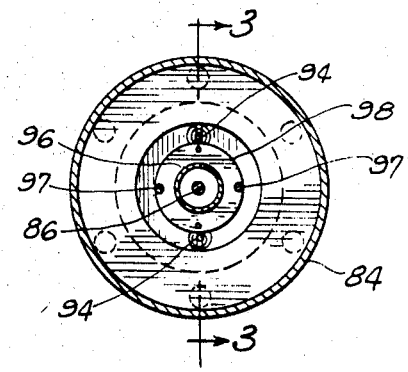
FIG. 4 is a sectional view taken generally along the line 4—4 of FIG. 3.

As already indicated, the evacuating devices 72 preferably comprise vacuum pumps of the orbitron type, as disclosed and claimed in the Herb and Pauly Patent No. 3,244,969. The basic construction of the orbitron pumps is shown in FIGS. 3 and 4. It will be seen that each pump 72 comprises a cylindrical casing or boundary electrode 84. The interior of the casing 84 is connected to the space to be evacuated, through the aperture 82. A cylindrical anode 86 is mounted axially in the casing 84. The anode 86 is preferably in the form of a rod or wire. A positive working voltage is maintained between the anode 86 and the casing 84, so that a radial electric field will be established therebetween.

Electrons are introduced into the radial field in such a manner that they will travel in spiral orbits around the central anode 86. The electrons are given initial angular momentum so that they will travel in orbits, rather than traveling directly to the anode 86. In the illustrated construction, the electrons are injected by means of one or more thermionic cathodes in the form of filaments 88, disposed parallel to the anode 86 and spaced outwardly therefrom. A shield wire 90 is interposed between each filament 88 and the anode 86. The shield wire 90 is parallel to both the anode 86 and the filament 88. Each shield wire 90 has an outwardly bent portion 92 which supports one end of the filament 88. The other end of the filament is supported by a terminal wire 94. The shield wire 90 modifies the radial electric field so that a high proportion of the electrons emitted by the adjacent filament 88 will go into orbits around the anode 86, rather than traveling directly to the anode.

The orbiting of the electrons is further enhanced by a terminating electrode in the form of a sleeve 96, mounted around the anode 86 and spaced outwardly therefrom, opposite a portion of each filament 88 and shield wire 90. The terminating sleeve 96 is normally maintained at or near the potential of the outer casing 84. As shown, the sleeve 96 is mounted on the casing 84, by means of rods or wires 97. The shield wires 90 are shown as being connected to a flange 98 on the terminating sleeve 96. However, the shield wires 90 could be brought out separately.

When the orbitron pump 72 is in operation, a high positive voltage is applied to the anode 86 with respect to the casing 84. The filaments 88 are heated by causing electrical currents to pass therealong. A high proportion of the electrons emitted by the filaments 88 go into spiral orbits around the anode 86. Some of the orbiting electrons collide with residual gas molecules in the vacuum space within the casing 84. The collisions cause ionization of the gas molecules. The positively charged gas ions are driven outwardly to the casing 84 by the electric field between the anode 86 and the casing. Getter material, such as titanium, is provided on the inside of the casing 84 to absorb the ions. The getter material also absorbs unionized molecules, particularly those of the more active gases.

The getter material is preferably deposited on the casing 84 by vaporizing getter material within the casing, so that it will travel outwardly and condense on the casing. The freshly condensed getter material is highly active in its gas absorbing ability. Moreover, the continuously condensing getter material buries the previously absorbed ions and molecules so that they will not be re-evolved.

In the illustrated construction, the getter material is vaporized by heating the anode 86, which incorporates a supply of the getter material. The preferred getter material is titanium, which is preferably mounted on the anode 86 in the form of a cylindrical slug or other member 100. Many of the orbiting electrons eventually impinge upon the titanium cylinder 100. The kinetic energy of the electrons is given up to the titanium cylinder in the form of heat. The titanium cylinder is preferably heated to a temperature at which titanium vapor is evolved directly from the solid titanium by sublimation. However, the temperature of the titanium cylinder is preferably kept below the melting point of titanium, so that liquid titanium will not be present. The titanium vapor from the hot cylinder 100 travels outwardly and is condensed on the relatively cool casing 84.

It will be evident that electrical power is required to operate the orbitron pumps 72. Special problems are involved in the derivation of the electrical power because of the high voltages which exist on the intermediate electrodes 74 and the high voltage electrode 18. Of course, the power could be derived from batteries mounted on the intermediate electrodes 74 and the high voltage electrode 18. However, in accordance with the present invention, the electrical power is preferably derived by means of a power transmission system which comprises a separate electric generator 102 on each of the intermediate electrodes 74, and also on the high voltage electrode 18. An electric motor 104 is provided on or adjacent the grounded electrode 28 to drive the generators 102. A series of aligned insulating shafts 106 are preferably provided to connect all of the generators 102 to the motor 104. Thus, the first insulating shaft 106 extends between the motor 104 and the first generator 102. The other insulating shafts 106 extend between the successive generators 102.

Each shaft 106 is illustrated as comprising a series of insulating cylinders 108, with metal disks 110 interspersed therebetween. The insulating cylinders 108 are securely bonded to the metal disks 110. The insulating components are preferably bonded to the metal components by the method disclosed and claimed in the copending application of Raymond G. Herb, Ser. No. 557,797.

The insulating shafts 106 are capable of withstanding the voltage between the adjacent intermediate electrodes 74, which may be well in excess of 1,000,000 volts. The illustrated accelerator has a potential distribution system which insures that the potential gradient along the insulators 36, and also along the insulating shafts 106, will be substantially uniform. For this purpose, corona discharge electrodes are mounted on the metal disks 40 of one of the insulators 36. Such electrodes comprise metal disks 112. Each disk 112 has a needle, sharp wire or other point 114 projecting from one side thereof. Each corona disk 112 is mounted on one of the disks 40 of the insulator 36. The needle 114 is directed toward the adjacent disk. The high electric field around the needle 114 sets up a corona discharge to the adjacent disk 112. The successive corona discharge gaps between the needles and the disks causes a small leakage of current which equalizes the potential drop between the adjacent disks 40 of the insulator 36. The effect of the successive corona gaps is much the same as would be produced by a series of resistors of high value. Such a series of potential distributing resistors could also be employed, instead of the corona gaps.

To equalize the potential gradient along the insulating shafts 106, the metal disks 110 on the shafts 106 are preferably arranged to be opposite the disks 40 on the adjacent insulator 36. Additional needles, sharp wires or other points 116 are mounted on the corona disks 112 and are directed laterally toward the disks 110. Intermittent corona discharges may occur between the needles 116 and the disks 110, with the result that the disks 110 are maintained in substantially the same potentials as the adjacent insulator disks 40. It will be realized that the disks 110 rotate with the shaft 106, while the needles 116 are stationary. However, the rotation of the disks 110 does not affect the corona gaps between the disks and the needles 116.

The illustrated accelerator 10 is single-ended, in that the accelerating tube 14 extends only between the high voltage electrode 16 and ground. Thus, the ion source 16 is mounted on the high voltage electrode 18. The charged particles produced by the ion source are accelerated only once across the high voltage.

Those skilled in the art will realize, however, that the invention is also applicable to double-ended accelerators, of the type disclosed in the copending application of Herb and Ferry, Ser. No. 557,818, filed June 15, 1966. In such double-ended accelerators, the high voltage electrode is mounted between two grounded electrodes by means of two sets of insulators. The accelerating tube extends from the first grounded electrode to the high voltage electrode, and then to the second grounded electrode. The ion source is mounted on the first grounded electrode. Thus, the charged particles are accelerated across the high voltage between the first grounded electrode and the high voltage electrode. Means are provided on the high voltage electrode to reverse the polarity of the charges on the charged particles. The particles are then accelerated a second time between the high voltage electrode and the second grounded support. In this way, the charged particles are accelerated to energy corresponding to twice the high voltage on the high voltage electrode. For the sake of simplicity, the invention has been illustrated in connection with a single-ended accelerator, but the invention is equally applicable to double-ended accelerators.

In the operation of the accelerator, an extremely high voltage is developed and maintained on the high voltage electrode 18. The intermediate electrodes 74 are at intermediate voltages, in accordance with the potential gradient between the high voltage electrode 18 and the grounded electrode 28. The charged particles to be accelerated are directed axially into the accelerating tube 14 by the ion source 16. The high voltage causes the acceleration of the charged particles along the entire length of the accelerating tube 14. The charged particles pass through the apertures 60 in the isolating diaphragms 58.

The accelerating tube 14 is subdivided into a plurality of sections 56 with the diaphragms 58 therebetween. The sections 56 are evacuated separately by the vacuum pumps 72, which are mounted on the intermediate electrodes 74, and also on the high voltage electrode 18.

The subdivision of the accelerating tube 14, and the separate pumping of the individual sections, increases the ability of the accelerating tube to withstand extremely high voltages, with a minimum chance of sparking and flashovers. Thus, an extremely high working voltage may be employed along the length of the accelerating tube 14.

The electrical generators 102 provide the electrical power to operate the vacuum pumps 72, mounted on the intermediate electrodes 74 and the high voltage electrode 18. The generator 102 on the high voltage electrode 18 may also provide the electrical power to operate the ion source 16.

All of the electrical generators 102 are continuously driven by the motor 104, which is connected to the generators by the insulating shafts 106. The motor 104 causes continuous rotation of all the shafts 106, which in turn rotate the electrical generators 102. As shown, it is preferred to arrange the shafts 106 so that they are axially aligned.

The potential gradient along each of the shafts 116 is equalized by the potential distribution system, comprising the corona electrodes 112, having points 116 directed toward the conductive disks 110 on the shaft. The disks 110 are interspersed between the insulating members 108. The corona gaps between the points 116 and the disks 110 have the effect of maintaining each disk 110 at approximately the same potential as the corresponding disk 40 on the adjacent main insulator 36. The corona electrodes 112 are mounted on the disks 40. The potential gradient is equalized along the insulators 36 by the points 114 which form corona gaps between the corona electrodes 112. The rings 42 extend around all of the insulators 36 and are connected to the conductive disks 40, so that the potential gradient along all of the insulators 36 is the same.

It will be evident that the electrical generators 102 are capable of supplying an adequate amount of power to operate the vacuum pumps 72 and the ion source 16. The generators 102 are efficiently driven by the insulating shafts 106. Thus, the power is effectively transmitted to the intermediate electrodes 74 and the high voltage electrode despite the extremely high voltage which exists between the high voltage electrode and ground. The electrical power produced by the generators 102 may be employed to operate other devices on the high voltage electrode 18 and the intermediate electrodes 74.

Various other modifications, alternative constructions and equivalents, may be employed without departing from the true spirit and scope of the invention, as exemplified in the foregoing description and defined in the following claims:

I claim:
1. A high voltage accelerator,
comprising a supporting member,
a high voltage electrode spaced from said supporting member,
at least one intermediate electrode disposed between said high voltage electrode and said supporting member,
insulating means connected between said electrodes and said supporting member,
means for establishing a high voltage between said high voltage electrode and said supporting member, an accelerating tube connected between said high voltage electrode and said supporting member for accelerating charged particles across said high voltage, a plurality of vacuum pumps mounted on said high voltage electrode and on said intermediate electrode, said pumps being connected to said accelerating tube for evacuating said tube, a plurality of rotary electrical generators mounted on said high voltage electrode and said intermediate electrode for supplying electrical operating power to said pumps, a rotary motor disposed adjacent said supporting member, and an insulating shaft having sections connected between said generators and said motor for transmitting rotary power to said generators from said motor.

2. An accelerator according to claim 1,
in which one section of said shaft extends between said motor and said generator on said intermediate electrode,
while another section of said shaft extends between said generators on said high voltage electrode and said intermediate electrode.

3. An accelerator according to claim 1,
in which said sections of said shaft are axially aligned.

4. An accelerator according to claim 1,
comprising a plurality of intermediate electrodes between said high voltage electrode and said supporting member,
a plurality of vacuum pumps mounted on said intermediate electrodes and connected to said accelerating tube,
and a plurality of generators mounted on said intermediate electrodes for supplying electrical power to said pumps,
said shaft having a series of axially aligned sections for connecting all of said generators to said motor.

5. An accelerator according to claim 1,
in which said shaft comprises a series of insulating members,
said conductibe disks for distributing the potential tween and secured thereto.

6. An accelerator according to claim 5,
comprising a series of potential distribution electrodes connected between said high voltage electrode and said supporting member,
and a plurality of corona points connected to said potential distribution electrodes and directed toward said conductive disks for distributing the potential along said shaft.

7. An accelerator according to claim 6,
in which said potential distribution electrodes comprise corona points forming corona gaps therebetween for equalizing the potential gradient along said potential distribution electrodes.

8. A high voltage generating apparatus,
comprising a supporting member at essentially ground potential,
an electrode spaced from said supporting member and adapted to be charged with a high voltage,
insulating means connected between said supporting member and said electrode,
means for establishing a high voltage between said electrode and said supporting member,
a device on said electrode and requiring electrical power for operation,
a rotary electric generator on said electrode for supplying the electrical power to said device,
a motor disposed adjacent said supporting member,
an insulating shaft connected between said motor and said generator for transmitting rotary power to said generator, said shaft being capable of withstanding the high voltage between said electrode and said supporting member, said shaft comprising a plurality of insulating cylindrical members, and a plurality of conductive disks interspersed between said insulating members and secured therebetween.

9. Generating apparatus according to claim 8,
in which said disks are made of metal bonded to said insulating cylindrical members.

10. Generating apparatus according to claim 8,
including a series of corona electrodes disposed between said first mentioned electrode and said supporting member,
said corona electrodes having points directed toward the adjacent corona electrodes and forming corona gaps therewith,
and additional pointed electrodes connected to said corona electrodes and directed toward said disks on said shaft to form additional corona gaps therewith so as to equalize the potential gradient along said shaft.

11. Generating apparatus according to claim 8,
including a series of stationary electrodes disposed between said first mentioned electrode and said supporting member,
means for equalizing the potential gradient between said stationary electrodes,
and a series of corona points on said stationary electrodes and directed toward said disks for equalizing the potential gradient along said shaft.

12. A high voltage accelerator,
comprising a supporting member at essentially ground potential,
an electrode spaced from said supporting member and adapted to be charged with a high voltage,
insulating means connected between said supporting member and said electrode,
means for establishing a high voltage between said electrode and said supporting member,
a device on said electrode and requiring electrical power for operation,
a rotary electric generator on said electrode for supplying the electrical power to said device,
a motor disposed adjacent said supporting member,
an insulating shaft connected between said motor and said generator for transmitting rotary power to said generator,
said shaft being capable of withstanding the high voltage between said electrode and said supporting member,
and an accelerating tube extending between said first mentioned electrode and said supporting member,
said device comprising a vacuum pump connected to said accelerating tube for evacuating said tube.

13. A high voltage accelerator,
comprising a supporting member at essentially ground potential,
an electrode spaced from said supporting member and adapted to be charged with a high voltage,
insulating means connected between said supporting member and said electrode,
means for establishing a high voltage between said electrode and said supporting member,
a device on said electrode and requiring electrical power for operation,
a rotary electric generator on said electrode for supply the electrical power to said device,
a motor disposed adjacent said supporting member,
an insulating shaft connected between said motor and said generator for transmitting rotary power to said generator, said shaft being capable of withstanding the high voltage between said electrode and said supporting member, and an accelerating tube extending between said first mentioned electrode and said supporting member, said device comprising an ion source connected to said accelerating tube for supplying charged particles thereto.

References Cited
UNITED STATES PATENTS

| | | | |
|---|---|---|---|
| 2,058,732 | 10/1936 | Simon | 310—5 X |
| 2,578,908 | 12/1951 | Turner | 310—5 X |
| 2,588,081 | 3/1952 | Bousman | 310—5 X |
| 2,636,664 | 4/1953 | Hertzler | 230—1 |
| 2,695,374 | 11/1954 | Jeppson | 315—15 |
| 3,125,283 | 3/1964 | Zaphiropoulos | 230—69 |
| 3,244,969 | 4/1966 | Herb et al. | 230—69 X |
| 3,388,290 | 6/1968 | Herb et al. | 230—69 X |

MILTON O. HIRSHFIELD, Primary Examiner

D. F. DUGGAN, Assistant Examiner

U.S. Cl. X.R.

313—7

PO-1050
(5/69)

UNITED STATES PATENT OFFICE
CERTIFICATE OF CORRECTION

Patent No. 3,473,056　　　　　　　　Dated October 14, 1969

Inventor(s)　JAMES A. FERRY

It is certified that error appears in the above-identified patent and that said Letters Patent are hereby corrected as shown below:

Col. 9, cancel lines 43 and 44 and substitute the following

-- and a series of conductive disks interspersed therebetween and secured thereto. --

Col. 10, lines 70 and 71, change "supply" to -- supplying --

SIGNED AND
SEALED
FEB 17 1970

(SEAL)
Attest:

Edward M. Fletcher, Jr.
Attesting Officer

WILLIAM E. SCHUYLER, JR.
Commissioner of Patents